United States Patent
Anthony et al.

(10) Patent No.: US 10,255,420 B2
(45) Date of Patent: Apr. 9, 2019

(54) CONFIGURING CRYPTOGRAPHIC SYSTEMS

(71) Applicant: GE Aviation Systems LLC, Grand Rapids, MI (US)

(72) Inventors: Deven J. Anthony, Tampa, FL (US); John Jared Creech, Palmetto, FL (US); David Barnard Pierce, Grand Rapids, MI (US); Joseph Bernard Steffler, Alto, MI (US); Jay Robert Pruiett, Ada, MI (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 177 days.

(21) Appl. No.: 14/817,484

(22) Filed: Aug. 4, 2015

(65) Prior Publication Data
US 2017/0041140 A1 Feb. 9, 2017

(51) Int. Cl.
*G06F 21/00* (2013.01)
*G06F 21/34* (2013.01)
(Continued)

(52) U.S. Cl.
CPC .............. *G06F 21/34* (2013.01); *G06F 21/31* (2013.01); *G06F 21/602* (2013.01); *G06F 21/62* (2013.01); *G06F 21/72* (2013.01); *G06Q 20/3823* (2013.01); *G06Q 20/3829* (2013.01); *G09C 1/00* (2013.01); *H04L 9/0877* (2013.01); *H04L 2209/84* (2013.01)

(58) Field of Classification Search
None
See application file for complete search history.

(56) References Cited

U.S. PATENT DOCUMENTS

| 6,438,468 B1 | 8/2002 | Muxlow et al. |
| 7,016,494 B2 | 3/2006 | Hopkins et al. |

(Continued)

FOREIGN PATENT DOCUMENTS

| CA | 2539879 C | 9/2013 |
| EP | 2693787 | 6/2014 |

(Continued)

OTHER PUBLICATIONS

"Customer Commitment Newsletter", Thales Communications, Inc, vol. No. 05, Issue No. 01, pp. 1-12, 2010.

(Continued)

*Primary Examiner* — Izunna Okeke
*Assistant Examiner* — Andrew J Steinle
(74) *Attorney, Agent, or Firm* — General Electric Company; William Scott Andes

(57) ABSTRACT

Systems and methods for configuring a cryptographic system, such as an avionic data transfer system associated with an aircraft, are provided. More particularly, systems and methods can be used to assemble a cryptographic key configuration (CKC) for use in a cryptographic system. A CKC can include various components for configuration of a cryptographic system. An administrator can generate CKCs for multiple host systems via a user interface (e.g., a graphical user interface) at a terminal and can deliver the CKCs to the host systems via an automated process by way of, for instance, a removable data cartridge.

22 Claims, 10 Drawing Sheets

(51) Int. Cl.
*H04L 9/08* (2006.01)
*G06F 21/62* (2013.01)
*G06F 21/72* (2013.01)
*G06F 21/60* (2013.01)
*G06F 21/31* (2013.01)
*G06Q 20/38* (2012.01)
*G09C 1/00* (2006.01)

(56) References Cited

U.S. PATENT DOCUMENTS

| | | | |
|---|---|---|---|
| 7,546,357 B2 | 6/2009 | Manchester et al. | |
| 7,761,904 B2 | 7/2010 | Hessel et al. | |
| 8,239,691 B2 | 8/2012 | Watanabe et al. | |
| 8,376,760 B1 | 2/2013 | Kostrzewski et al. | |
| 8,542,828 B2 | 9/2013 | Rudland et al. | |
| 8,688,987 B2 | 4/2014 | Kirk et al. | |
| 8,844,060 B2 | 9/2014 | Applegate | |
| 2005/0086471 A1 | 4/2005 | Spencer | |
| 2006/0198525 A1* | 9/2006 | Brey | H04L 63/06 380/278 |
| 2007/0127719 A1 | 6/2007 | Selander et al. | |
| 2007/0208930 A1* | 9/2007 | Blank | H04L 9/0827 713/150 |
| 2009/0246985 A1 | 10/2009 | MacKey et al. | |
| 2010/0098243 A1 | 4/2010 | Chopart | |
| 2010/0315257 A1 | 12/2010 | Trebbels et al. | |
| 2011/0072276 A1 | 3/2011 | Lee et al. | |
| 2012/0260100 A1 | 10/2012 | Applegate | |
| 2012/0321076 A1* | 12/2012 | Shah | H04L 9/0897 380/44 |
| 2014/0032903 A1* | 1/2014 | Kirk | H04L 63/18 713/168 |

FOREIGN PATENT DOCUMENTS

| | | |
|---|---|---|
| GB | 2507654 A | 5/2014 |
| WO | 2007095375 A2 | 8/2007 |

OTHER PUBLICATIONS

"Chairman of the Joint Chiefs of Staff Manual", Link 16 Joint Key Management Plan, pp. 58 pages, Apr. 28, 2015.

GB Combined Search & Examination Report issued in connection with corresponding GB Application No. 1613102.1 dated Jan. 26, 2017.

Machine translation and Notice of Allowance issued in connection with corresponding JP Application No. 2016142913 dated Oct. 17, 2017.

French Patent Application No. FR1657397 Written Opinion/Search Report.

* cited by examiner

CONFIGURING CRYPTOGRAPHIC SYSTEMS

FIELD OF THE INVENTION

The present subject matter relates generally to cryptographic processing of data.

BACKGROUND OF THE INVENTION

Cryptographic systems can include cryptographic equipment used for the processing and transfer of secure data. For instance, data transfer systems, such as data transfer systems used in aviation systems for aircraft, can include cryptographic equipment used to receive and transfer secure data. Cryptographic systems typically require one or more keys to be loaded into the system to allow the cryptographic processing of data. In addition, cryptographic equipment can require the presence of a cryptographic ignition key (CIK) for user authentication.

Administering cryptographic processing functionality on a data transfer system can be a cumbersome manual process. For instance, physical access to each cryptographic system can be required to create, modify, and/or delete user accounts and CIK associations, load keys, and configure cryptographic processing channels. As a result, the configuration of multiple cryptographic systems can be time consuming and tedious.

BRIEF DESCRIPTION OF THE INVENTION

Aspects and advantages of embodiments of the present disclosure will be set forth in part in the following description, or may be learned from the description, or may be learned through practice of the embodiments.

One example embodiment of the present disclosure is directed to a method for configuring a cryptographic system associated with an aircraft. The method includes receiving, by one or more processors, data indicative of a user specifying a cryptographic key configuration action and accessing, by the one or more processors, one or more databases storing cryptographic information. The method further includes generating, by the one or more processors, a cryptographic key configuration based at least in part on the cryptographic information and cryptographic key configuration action. The method further includes transferring, by the one or more processors, the cryptographic key configuration for storage on a removable data storage device.

Another example aspect of the present disclosure is directed to a terminal for generating a cryptographic key configuration for configuring a cryptographic system. The terminal includes one or more processors and one or more memory devices. The one or more memory devices store computer-readable instruction that when executed by the one or more processors cause the one or more processors to perform operations. The operations include receiving data indicative of a user specifying a cryptographic key configuration action and accessing one or more databases storing cryptographic information. The operations further include generating a cryptographic key configuration based at least in part on the cryptographic information and the cryptographic key configuration action. The operations further include transferring the cryptographic key configuration to a removable data storage device for transfer to a cryptographic system such that the cryptographic system is configured in accordance with the cryptographic key configuration.

Yet another example aspect of the present disclosure is directed to a cryptographic system. The system includes a removable data storage device and a terminal configured to generate a cryptographic key configuration based at least in part one a user interaction with a user interface. The terminal can be configured to transfer the cryptographic key configuration to the removable data storage device. The system further includes an avionic data transfer system comprising one or more cryptographic units. The avionic data transfer system can be configured to interface with the removable data storage device. When the removable data storage device is interface with the removable data storage device, the avionic data transfer system can be operable to configure one or more cryptographic units based at least in part on the cryptographic key configuration.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
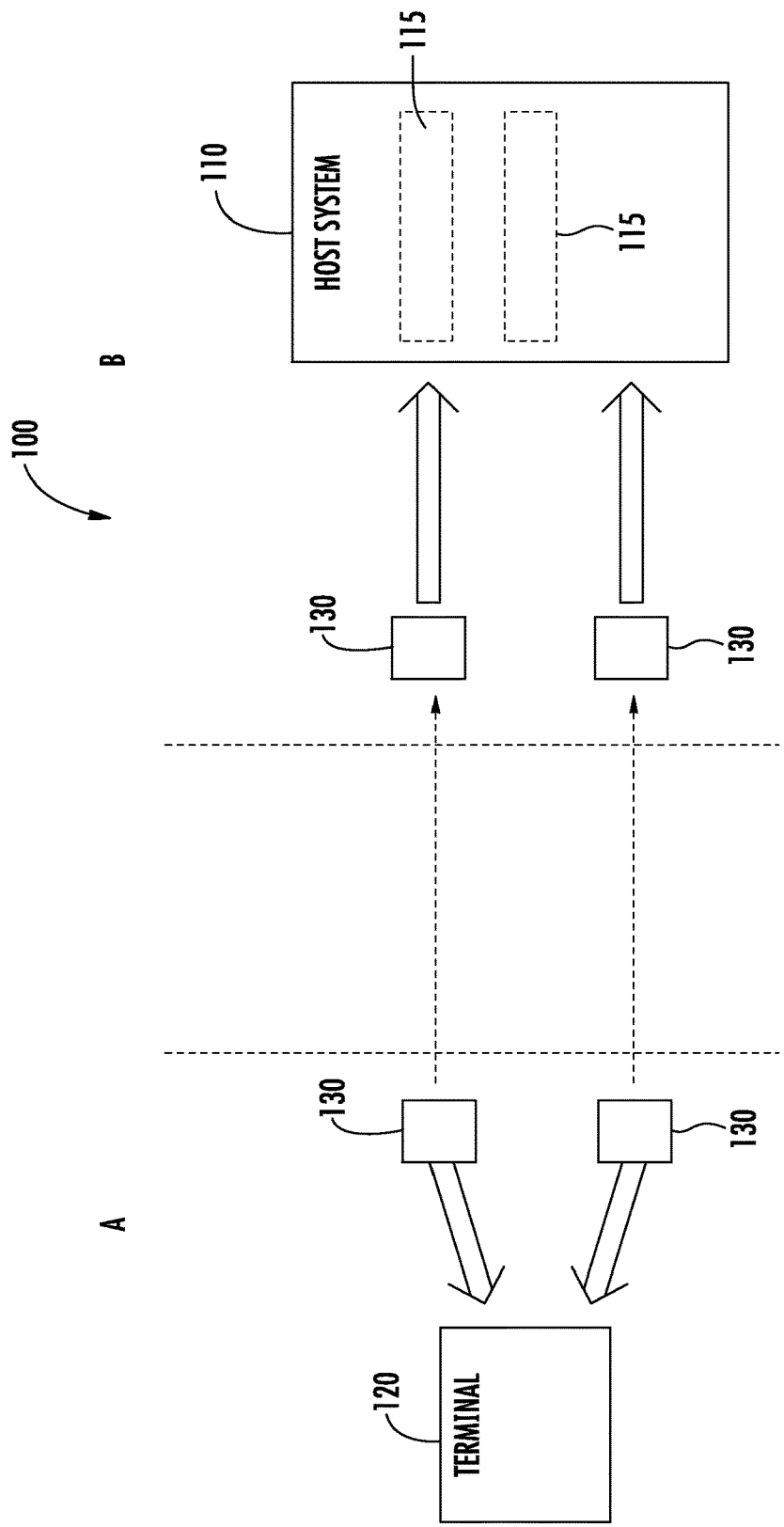
FIG. 1 depicts an example cryptographic system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to configuring cryptographic systems, such as cryptographic systems associated with an avionic data transfer system for an aircraft. More particularly, systems and methods can be used to assemble a cryptographic key configuration (CKC) for use in a cryptographic system having one or more cryptographic units are provided.

In one example implementation, a CKC can include various components for configuration of a cryptographic system, including authorized user account data, a mapping of authorized user accounts to cryptographic ignition keys (CIKs), cryptographic keys for cryptographic processing of data, a mapping of cryptographic keys to cryptographic processing channels of one or more cryptographic units, and/or a script (e.g., key loader script) used to load the cryptographic keys and/or to generate user authentication prompts. In some embodiments, the CKC can be a platform cryptographic key configuration (PCKC) which can additionally include cryptographic unit identifiers used to map cryptographic keys, CIKs, and user account data to various cryptographic units in an avionics data transfer system associated with, for instance, an aircraft.

According to example embodiments, an administrator can assemble the CKCs for multiple host systems via a user interface (e.g., a graphical user interface) at a terminal and can deliver the CKCs to the host systems via an automated process by way of some media, such as a removable data cartridge. In this way, an administrator can prepare CKCs for multiple cryptographic systems (e.g., avionic data transfer systems) with increased efficiency relative to manual configuration of each cryptographic system.

A terminal used for configuring CKCs can include one or more processors and one or more computer-readable instructions. The one or more instructions when executed by the one or more processors can cause the one or more processors to perform operations, including creating links between individual data repositories to efficiently package the data and links between data into a CKC. The operations can further include storing the CKC on a removable data cartridge that can be interfaced with a host system. The instructions can be executed to implement a user interface that allows an administrator to perform CKC actions required to generate the CKC.

A technical effect of example aspects of the present disclosure is allowing the configuration of cryptographic systems through use of a CKC generated at a remote terminal and delivery of the CKC to the host systems with greater efficiency. This can result in increased speed and accuracy of cryptographic system configuration relative to manual configuration of the cryptographic systems.

Example aspects of the present disclosure are discussed with reference to avionic data transfer systems associated with an aircraft for purposes of illustration and discussion. Those of ordinary skill in the art, using the disclosures provided herein, will understand that the subject matter described herein can be used with other cryptographic systems without deviating from the scope of the present disclosure.

FIG. 1 depicts an example cryptographic system 100 according to example embodiments of the present disclosure. As shown the cryptographic system 100 includes a host system 110, a terminal 120, and one or more removable data cartridges 130 used to transfer information to the host system 110. The host system 110 can be a data transfer system associated with one or more cryptographic units 115. Each cryptographic unit 115 can include one or more processors configured to cryptographically process (e.g., encrypt/decrypt) data using various encryption algorithms and/or perform other cryptographic functions. In some embodiments, the host system 110 can be a data transfer system associated with an avionic data transfer system associated with an aircraft. In some embodiments, the host system 115 can include a plurality of cryptographic units 115 in communications with each other over a network, such as an aircraft communication bus (e.g., ARINC-429 or MIL-STD-1553) or other network connection (e.g., Ethernet).

Each cryptographic unit 115 can require one or more cryptographic keys or other cryptographic variables (e.g., frequency hopping tables) to enable the cryptographic processing of data. In addition, each cryptographic unit 115 can require the presence of a cryptographic ignition key (CIK) for authorized user authentication. The cryptographic unit 115 can require a CIK to be interfaced with the cryptographic unit 115 before undertaking the cryptographic processing of data.

The system 100 includes one or more removable data cartridges 130. Each removable data cartridge 130 can be a removable data storage device. The one or more removable data cartridges 130 can be used to transfer data subject to cryptographic processing to the host system 110. In one embodiment, secure aviation data for an aviation system can be transferred from the terminal 120 to one or more cryptographic units 115 of the host system 110 using the removable data cartridges 130.

For example, the one or more removable data cartridges 130 can be interfaced with terminal 120 located at site A. Information, including aviation data and/or cryptographic key configuration (CKC) data, can be transferred to the removable data cartridge(s) 130 at the terminal. The data transferred to the removable data cartridge(s) 130 can include both encrypted ("black") data as well as unencrypted ("red") data.

The removable data cartridge(s) 130 can be transported to site B to the location of the host system 110. For instance, in one embodiment, the removable data cartridge(s) 130 can be transported to the location of an aircraft. The removable data cartridge(s) 130 can be interfaced with the host system 110. According to example aspects of the present disclosure, the removable data cartridge(s) 130 can transfer data subject to cryptographic processing (e.g., the secure aviation data) to the host system 110. In some embodiments, the removable data cartridge(s) 130 can transfer one or more cryptographic keys (e.g., as a key fill device) to the host system 110. In some embodiments, the removable data cartridge(s) 130 can include an embedded CIK for user authentication.

Figure 2:
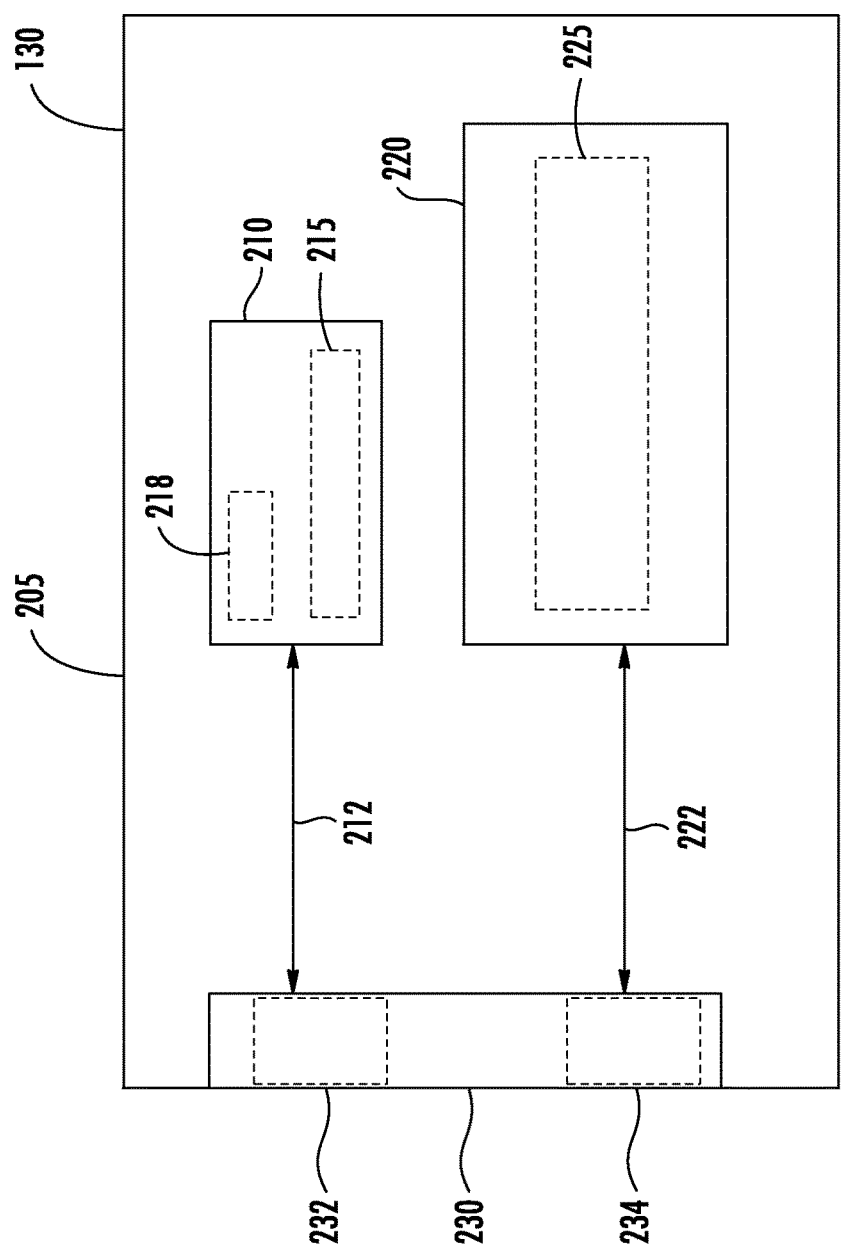
FIG. 2 depicts an example removable data cartridge according to example embodiments of the present disclosure.

FIG. 2 depicts an example removable data cartridge 130 according to example embodiments of the present disclosure. The removable data cartridge 130 can include a housing 205 to house and protect various internal components of the removable data cartridge 130. As shown in FIG. 2, the removable data cartridge 130 includes a dedicated key memory 210 and a dedicated data memory 220 that is separate from the key memory 210 within the housing 205. The key memory 210 can store one or more cryptographic keys 215 for use by a host system (e.g., host system 110 of FIG. 1) in cryptographic processing of data. The data memory 220 can store data subject to cryptographic processing 225 (e.g., secure aviation data). The data memory 220 can include both encrypted and decrypted data. In some embodiment, the data memory 220 does not store data (e.g., one or more cryptographic keys) that is used in cryptographic processing of the data by one or more cryptographic units associated with a host system.

As shown, the removable data cartridge 130 includes at least one connector 230. The connector 230 can be interfaced with an external device (e.g., a terminal or host system) by engaging the connector 230 with a suitable slot, socket, receptacle, or connection located on the external device to provide a mechanical and electrical connection with the external device. In the example embodiment shown in FIG. 2, the connector 230 can include first pins 232 and second pins 234. The first pins 232 and second pins 234 can be part of the same connector or separate connectors. In one embodiment, the first pins 232 can be a U-229 6-pin connector type used to transfer information using one or more serial protocols. The second pins 234 can include one or more pins arranged for a USB (universal serial bus) plug connection or similar connection.

The removable data cartridge 130 of FIG. 2 includes a key memory interface 212. The key memory interface 212 can communicate one or more cryptographic keys 215 stored in the key memory 210 using the first pins 232 of the connector (s) 230 according to a first protocol. The first protocol can be a serial protocol suitable for the transfer of cryptographic keys, such as a serial protocol used by key fill devices. As an example, the first protocol can be a DS-101 or DS-102 protocol used for the transfer of key material. Other suitable protocols can be used as the first protocol without deviating from the scope of the present disclosure, such as a USB protocol, I2C protocol, SPI protocol, or other suitable protocol.

The removable data cartridge 130 of FIG. 2 further includes a data memory interface 222 that is separate from the key memory interface 212. The data memory interface 222 can communicate data subject to cryptographic processing 225 stored in the data memory 220 using second pins 234 of the connector(s) 230 using a second protocol. In some embodiments, the second protocol can be different from the first protocol. The second protocol can be, for instance, a serial protocol suitable for the transfer of data subject to cryptographic processing 225, such as a USB protocol, I2C protocol, SPI protocol, or other suitable protocol.

In some embodiments, the removable data cartridge 130 can include a key loader 218. The key loader 218 can include computer-readable instructions that when executed by one or more processors (e.g., processors associated with the removable data cartridge or an external device) cause the one or more processors to perform operations. The operations can include loading the one or more cryptographic keys 215 stored in the key memory 210 to the host system via the key memory interface 212 according to the first protocol (e.g., a DS-101 or DS-102 protocol). In some embodiments, the key loader 218 can automatically load the one or more cryptographic keys 215 to the host system when the removable data cartridge 130 is interfaced with the host system. In other embodiments, the key loader 218 can transfer the one or more cryptographic keys 215 in response to a request (e.g., as a result of a user input via a user interface) to transfer the one or more cryptographic keys 215.

Figure 3:
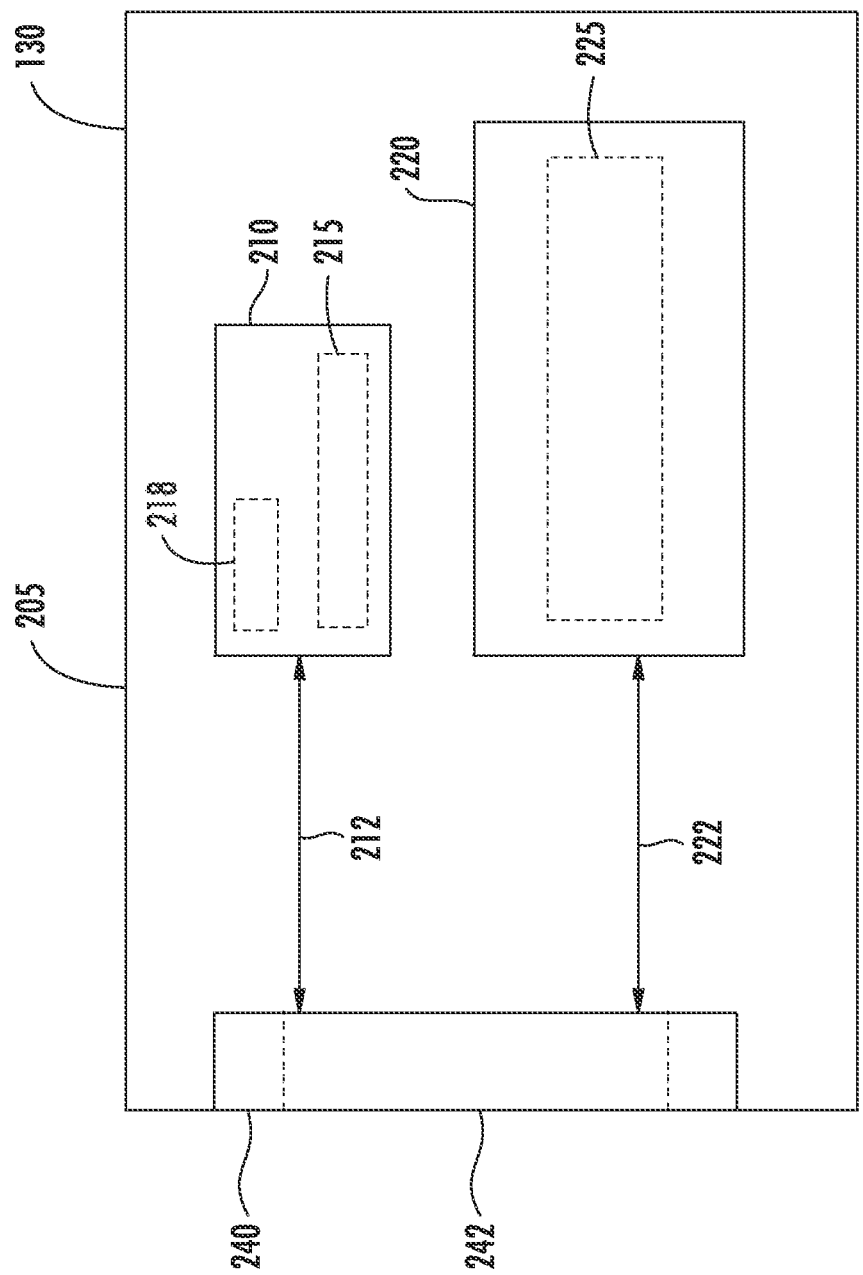
FIG. 3 depicts an example removable data cartridge according to example embodiments of the present disclosure.

FIG. 3 depicts a removable data cartridge 130 according to another example embodiment of the present disclosure. The removable data cartridge 130 of FIG. 3 is similar to the removable data cartridge 130 of FIG. 2 except that the removable data cartridge 130 of FIG. 3 includes a connector 240 having one set of pins 242 for communicating both the one or more cryptographic keys 215 and the data subject to cryptographic processing 225. The pins 242 can have any suitable configuration, such as a U-229 6-pin connector configuration, a USB (universal serial bus) plug configuration, or other suitable configuration.

The key memory 210 can be separately accessible via the pins 242 of the connector 240 relative to the data memory 220. More particularly, the one or more cryptographic keys 215 stored in the key memory 210 may not be accessible by the one or more pins 242 of the connector 240 at the same time as the data subject to cryptographic processing 225 stored in the data memory 220. In one embodiment, the one or more cryptographic keys 215 stored in the key memory 210 can be first transferred via the key memory interface 212 according to a first protocol. Subsequent to the transfer of the one or more cryptographic keys 215, the data subject to cryptographic processing 225 can be transferred via the data memory interface 222 via a second protocol. In other embodiments, the data subject to cryptographic processing 225 can be transferred prior to the transfer of the one or more cryptographic keys 215.

According to another example aspect of the present disclosure, the removable data cartridge(s) can include an embedded CIK device for user authentication during the cryptographic processing of data. In these example embodiments, a user desiring to perform cryptographic processing of data by one or more cryptographic units of a host system can interface the removable data cartridge(s) with the host system. A CIK device embedded in the removable data cartridge can communicate a CIK to the host system for user authentication. Once a user has been authenticated, data can be processed by the host system. For instance, data transferred to the host system can be encrypted and/or decrypted using one or more cryptographic keys.

Figure 4:
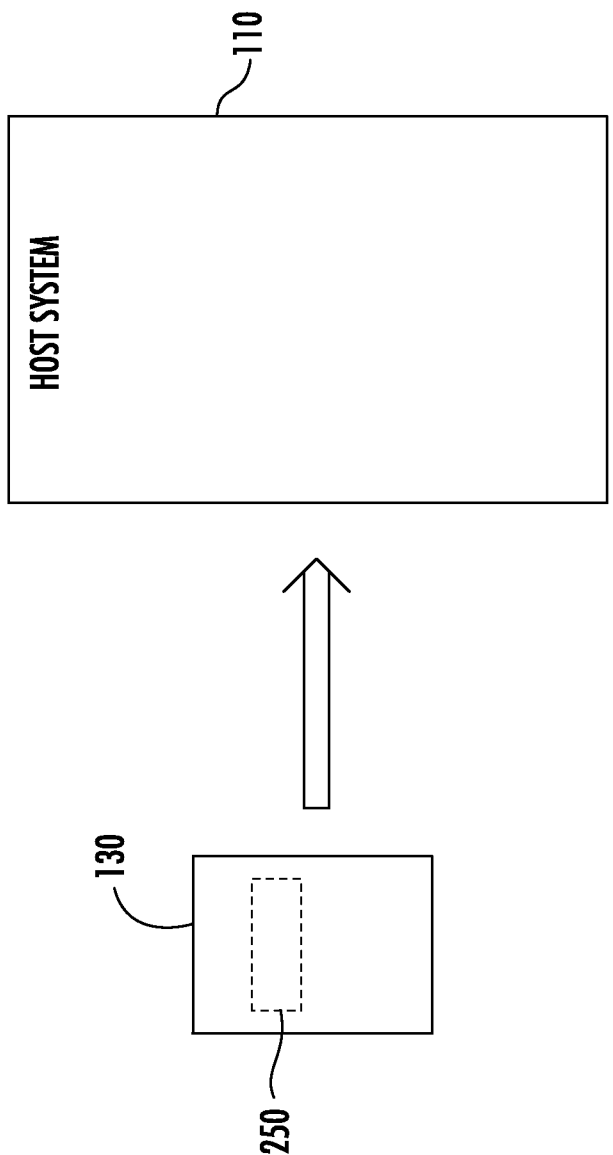
FIG. 4 depicts the example interfacing of a removable data cartridge having an embedded cryptographic ignition key (CIK) device according to example embodiments of the present disclosure.

For instance, FIG. 4 depicts an example removable data cartridge 130 with an embedded CIK device 250 according to example embodiments of the present disclosure. When the removable data cartridge 130 is engaged with or otherwise interfaced with the host system 110, the CIK device 250 embedded in the removable data cartridge can communicate a CIK to the host system 110 over a suitable CIK interface. In addition, the removable data cartridge 130 can transfer data subject to cryptographic processing (e.g., planning data) to the host system 110. The CIK can be communicated by the removable data cartridge 120 over the same interface or a different interface as the data subject to cryptographic processing.

For instance, in one embodiment, the data subject to cryptographic processing and the CIK can be communicated via at least one connector on the removable data cartridge 130 that is engaged with the host system 110. In one embodiment, the data subject to cryptographic processing can be communicated via the at least one connector on the removable data cartridge 130 that is engaged with the host system 110 and the CIK can be communicated over a separate interface, such as a dedicate CIK connector or a wireless interface.

Figure 5:
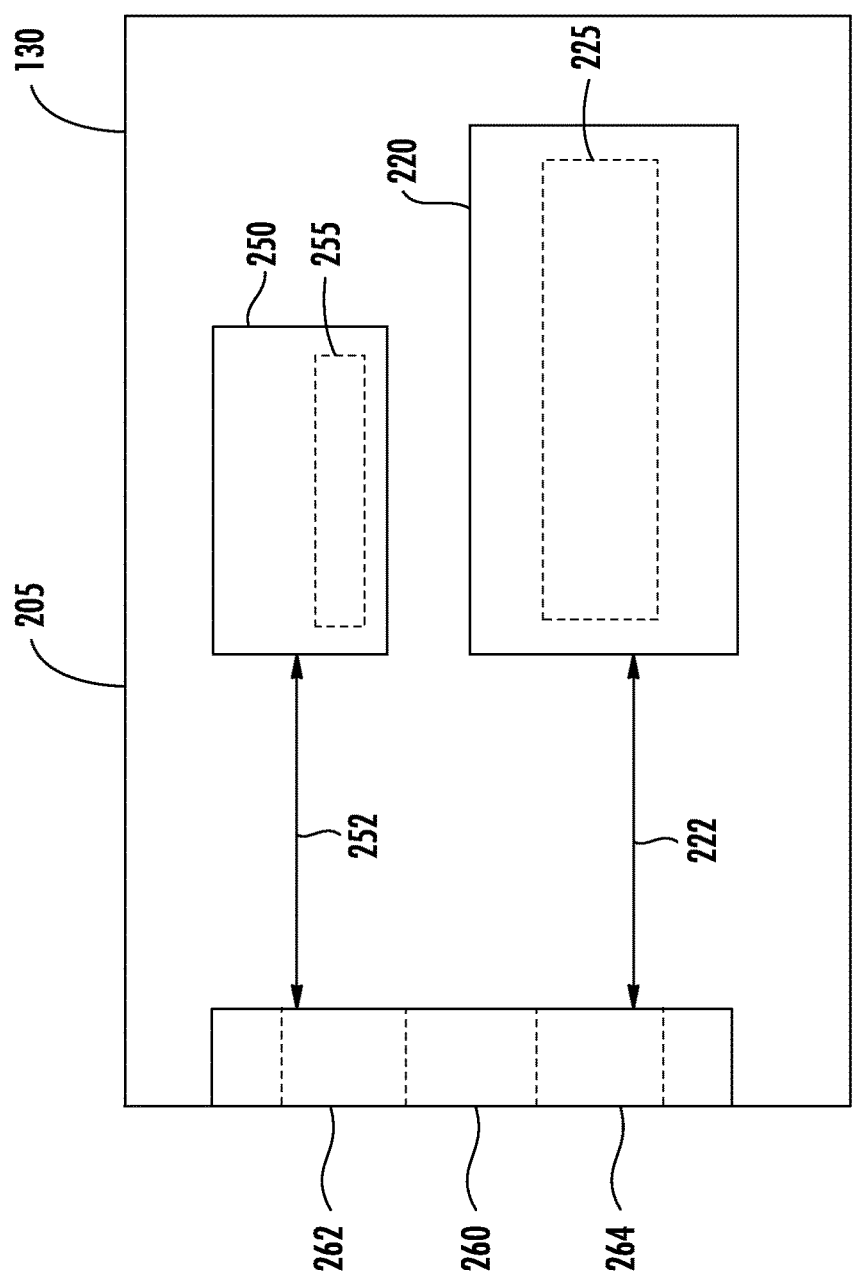
FIG. 5 depicts an example removable data cartridge having an embedded CIK device according to example embodiments of the present disclosure.

FIG. 5 depicts an example removable data cartridge 130 having an embedded CIK device according to example aspects of the present disclosure. The removable data cartridge 130 includes a housing 205 to house and protect various internal components of the removable data cartridge 130. As shown in FIG. 5, the removable data cartridge 130 includes a data memory 220. The data memory 220 can store data subject to cryptographic processing 225 (e.g., secure aviation data). The data memory 220 can include both encrypted and decrypted data. In some embodiments, the data memory 220 does not store data (e.g., one or more cryptographic keys) that is used in cryptographic processing of the data by one or more cryptographic units associated with a host system.

According to example aspects of the present disclosure, the removable data cartridge 130 includes an embedded CIK device 250. The embedded CIK device 250 can include circuitry configured to provide a CIK 255 to external devices for user authentication. For instance, a user can be associated with a particular CIK. An external device may need to receive the CIK associated with an authorized user prior to processing or communicating data. In one embodiment, the CIK device 250 can include a memory storing the CIK 255. In one embodiment, the CIK device 250 can include circuitry (e.g., a memory and transmitter) configured to wireless transmit a CIK for detection at an external device.

The removable data cartridge 130 of FIG. 5 includes at least one connector 260. The connector 260 can be interfaced with an external device (e.g., a terminal or host system) by engaging the connector with a suitable slot, receptacle, or connection located on the external device to provide a mechanical and electrical connection with the external device. In the example embodiment shown in FIG. 5, the connector 260 can include first pins 262 and second pins 264. The first pins 262 and second pins 264 can be part of the same connector or separate connectors.

The removable data cartridge 130 of FIG. 5 includes a CIK interface 252. The CIK interface 252 can communicate one or more CIKs 255 associated with the CIK device 250 using the first pins 262 of the connector(s) 260. The removable data cartridge 130 of FIG. 5 further includes a data memory interface 222 that is separate from the CIK interface 252. The data memory interface 222 can communicate data subject to cryptographic processing 225 stored in the data memory 220 using second pins 234 of the connector(s) 260.

In other embodiments, the CIK interface 252 can communicate one or more CIKs and the data memory interface 222 can communicate data subject to cryptographic processing over the same pins of connector connector(s) 260. For instance, one or more CIKs 255 can be first communicated via connector(s) 260 to an external device for user authentication. Data subject to cryptographic processing 225 can then be communicated via connector(s) 260 to the external device for cryptographic processing.

Figure 6:
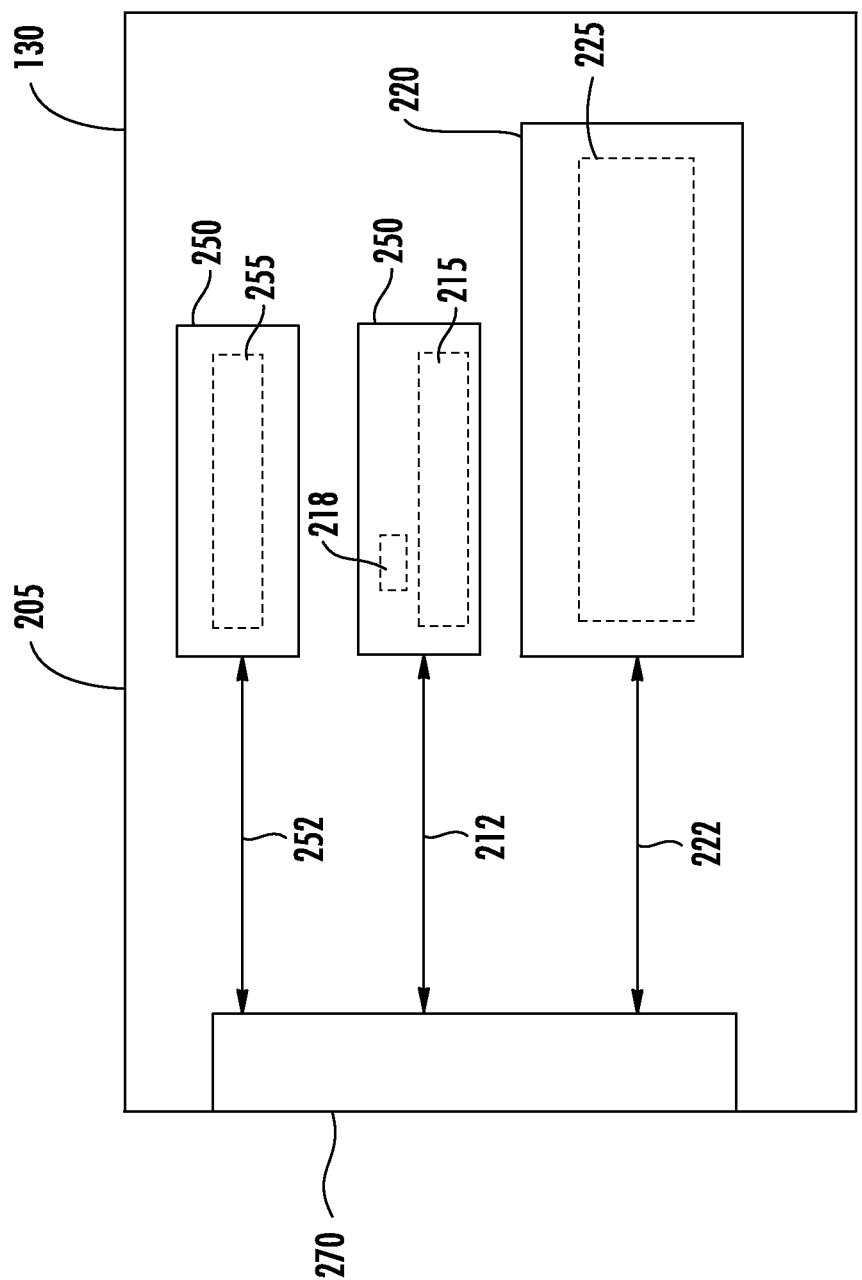
FIG. 6 depicts an example removable data cartridge having a key memory and an embedded CIK device according to example embodiments of the present disclosure.

FIG. 6 depicts an example removable data cartridge 130 according to another example embodiment of the present disclosure. The removable data cartridge 130 of FIG. 6 can be a combination key fill device, data transfer device, and CIK device for use with a cryptographic system. More particularly, the removable data cartridge includes a key memory 210, a data memory 220, and a CIK device 250 all stored within the same housing 205. The key memory 210 can store one or more cryptographic keys 215 for use by a host system in cryptographic processing of data. The data memory 220 can store data subject to cryptographic processing 225 (e.g., secure aviation data). The data memory 220 can include both encrypted and decrypted data. In some embodiment, the data memory 220 does not store data (e.g., one or more cryptographic keys) that is used in cryptographic processing of the data by one or more cryptographic units associated with a host system.

The CIK device 250 can include circuitry configured to provide a CIK 255 to external devices for user authentication. In one embodiment, the CIK device 250 can include a memory storing the CIK 255. In one embodiment, the CIK device 250 can include circuitry (e.g., a memory and transmitter) configured to wireless transmit a CIK for detection at an external device.

The removable data cartridge 130 of FIG. 6 includes one or more connectors 270. The connector(s) 270 can be interfaced with an external device (e.g., a terminal or host system) by engaging the connector(s) with a suitable slot, receptacle, or connection located on the external device to provide a mechanical and electrical connection with the external device.

The removable data cartridge 130 of FIG. 6 includes a key memory interface 212. The key memory interface 212 can communicate one or more cryptographic keys 215 stored in the key memory 210 via the connector(s) 270 according to a first protocol. The first protocol can be a serial protocol suitable for the transfer of cryptographic keys, such as a serial protocol used by key fill devices. As an example, the first protocol can be a DS-101 or DS-102 protocol used for the transfer of key material. Other suitable protocols can be used as the first protocol without deviating from the scope of the present disclosure, such as a USB protocol, I2C protocol, SPI protocol, or other suitable protocol.

The removable data cartridge 130 of FIG. 6 further includes a data memory interface 222 that is separate from the key memory interface 212. The data memory interface 222 can communicate data subject to cryptographic processing 225 stored in the data memory 220 via connector(s) 270 using a second protocol. In some embodiments, the second protocol can be different from the first protocol. The second protocol can be, for instance, a serial protocol suitable for the transfer of data subject to cryptographic processing 225, such as a USB protocol, I2C protocol, SPI protocol, or other suitable protocol. The removable data cartridge 130 of FIG. 6 includes a CIK interface 252. The CIK interface 252 can communicate one or more CIKs 255 associated with the CIK device 250 using connector(s) 270. The one or more CIKs 255 can be used by the host system for user authentication.

Figure 7:
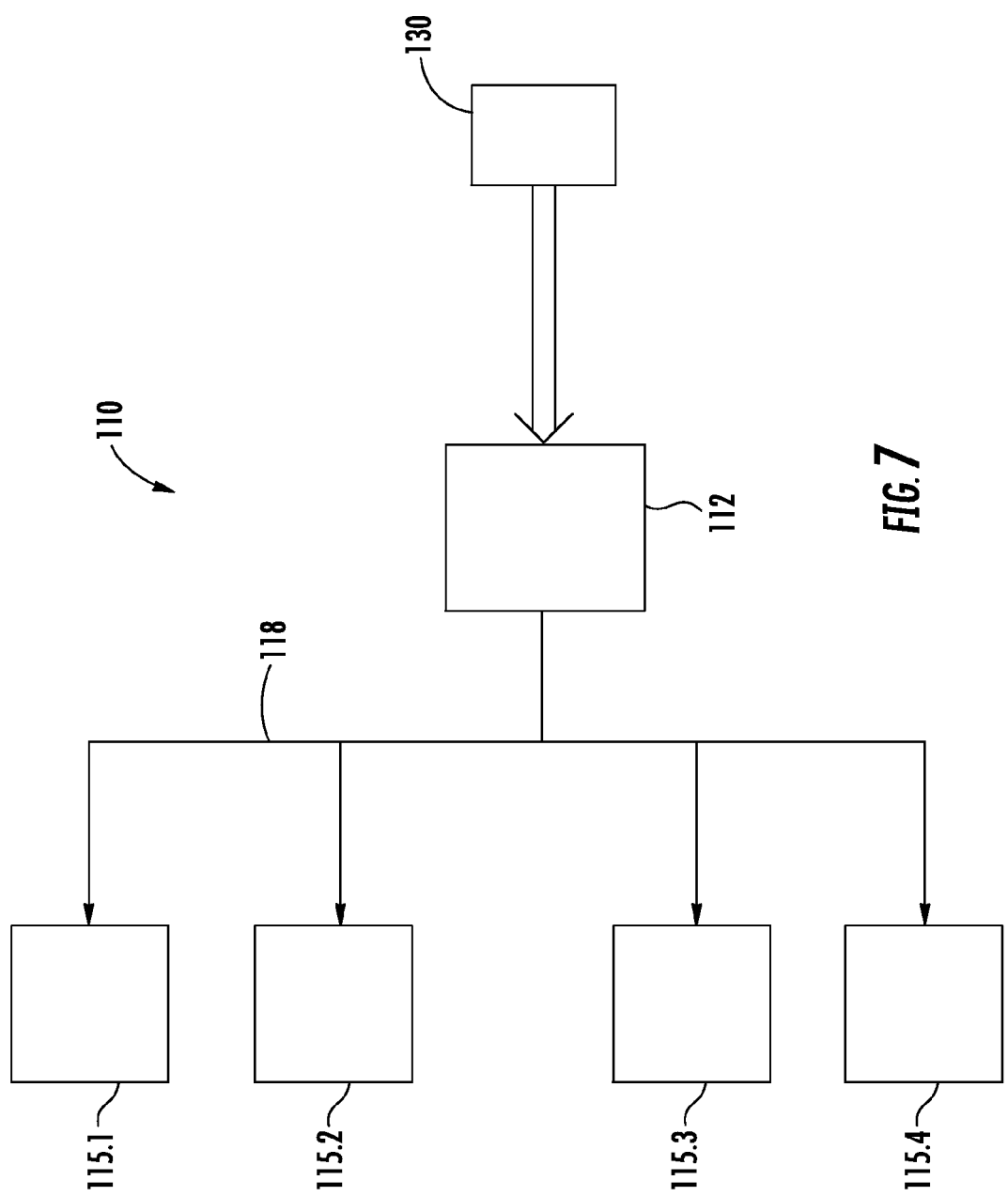
FIG. 7 depicts an example avionic data transfer system according to example embodiments of the present disclosure.

One example host system according to example embodiments of the present disclosure can be an avionic data transfer system having a plurality of cryptographic units. According to example aspects of the present disclosure, a host device (e.g., a cryptographic unit or other device) of the avionic data transfer system can act as a key server distributing one or more cryptographic keys loaded to the host device using a removable data cartridge to the one or more cryptographic units of the avionic data transfer system FIG. 7 depicts an example host system 110 according to example embodiments of the present disclosure. The host system 110 can be an avionic data transfer system associated with an aircraft. The host system 110 can include a plurality of cryptographic units 115. In FIG. 7, the host system 110 includes four cryptographic units 115.1, 115.2, 115.3, and 115.4. Those of ordinary skill in the art, using the disclosures provided herein, will understand that more or fewer cryptographic units 115 can be included in the host system 110 without deviating from the scope of the present disclosure.

The host system 110 includes a host device 112. The host device 112 can be a cryptographic unit configured for cryptographically processing of data. In addition and/or in the alternative, the host device 112 can be a dedicated device for interfacing with a key fill device or other external device for receiving one or more cryptographic keys. The host device 112 can include a slot, socket, receptacle, or connection to interface with an external device for loading one or more cryptographic keys to the host device 112.

In one embodiment, the host device 112 can be interfaced with a removable data cartridge 130. The removable data cartridge 130 can be any removable data cartridge according to example embodiments of the present disclosure. In one embodiment, the removable data cartridge 130 includes both a key memory storing one or more cryptographic keys and a data memory storing data subject to cryptographic processing. In this way, the removable data cartridge 130 can act as both a key fill device and a data transfer device. In some embodiments, the removable data cartridge 130 can include an embedded CIK device.

The host device 112 can be in communication with the cryptographic units 115.1, 115.2, 115.3, and 115.4 over a data bus 118. For instance, the host device 112 can be in communication with the cryptographic units 115.1, 115.2, 115.3, and 115.4 via an aircraft data bus, such as an MIL-STD-1554, ARINC-429, or other suitable data bus. In other embodiments, the host device 112 can be in communication with the cryptographic units 115.1, 115.2, 115.3, and 115.4 over an Ethernet connection or other data bus.

The host device 112 can act as a key server for the avionic data transfer system. More particularly, the host device 112 can receive one or more cryptographic keys from the removable data cartridge 130. The one or more cryptographic keys can include encrypted keys ("black keys") or decrypted keys ("red keys"). The host device 112 can also receive data subject to cryptographic processing (e.g., secure aviation data) from the removable data cartridge 130.

The host device 112 can use the red keys and/or can decrypt the black keys for cryptographic processing of the data. In addition, the host device 130 can distribute one or more of the red keys and/or black keys to various of the cryptographic units 115.1, 115.2, 115.3, and 115.4 for cryptographic processing.

In one embodiment, the host device 112 can include a user interface (e.g., a graphical user interface presented on a display associated with the host device) that allows a user to interact with the host device 112 to distribute the one or more cryptographic keys among the various cryptographic units 115.1, 115.2, 115.3, and 115.4. For example, a user can interact with the user interface to specify that a particularly cryptographic key is to be distributed to cryptographic unit 115.2. The host device 112 can then distribute the cryptographic key to the cryptographic unit 115.2 for cryptographic processing.

In one embodiment, the host device 112 can automatically distribute the one or more cryptographic keys to the cryptographic units 115.1, 115.2, 115.3, and 115.4 based on header data associated with the one or more cryptographic keys received from the removable data cartridge 130. The header data for a cryptographic key can specify a particular destination cryptographic unit for the cryptographic key. For instance, the host device 112 can receive a cryptographic key having header data specifying that the cryptographic key is for use with cryptographic unit 115.1. The host device 112 can automatically distribute the cryptographic key to cryptographic unit 115.1 for cryptographic processing of data. The header data can be associated with the cryptographic key, for instance, at a terminal used for aviation planning.

According to example embodiments of the present disclosure, a cryptographic key configuration (CKC) can be generated at a terminal for configuration of various aspects of a cryptographic system. The CKC can be stored on a removable data cartridge at the terminal and transported to a host system, such as an avionic data transfer system associated with an aircraft. The CKC can be loaded into the avionic data transfer system and used to configure various aspects of the avionic data transfer system, such as mapping of authorized users and CIKs, mapping of cryptographic keys to various cryptographic units, etc.

Figure 8:
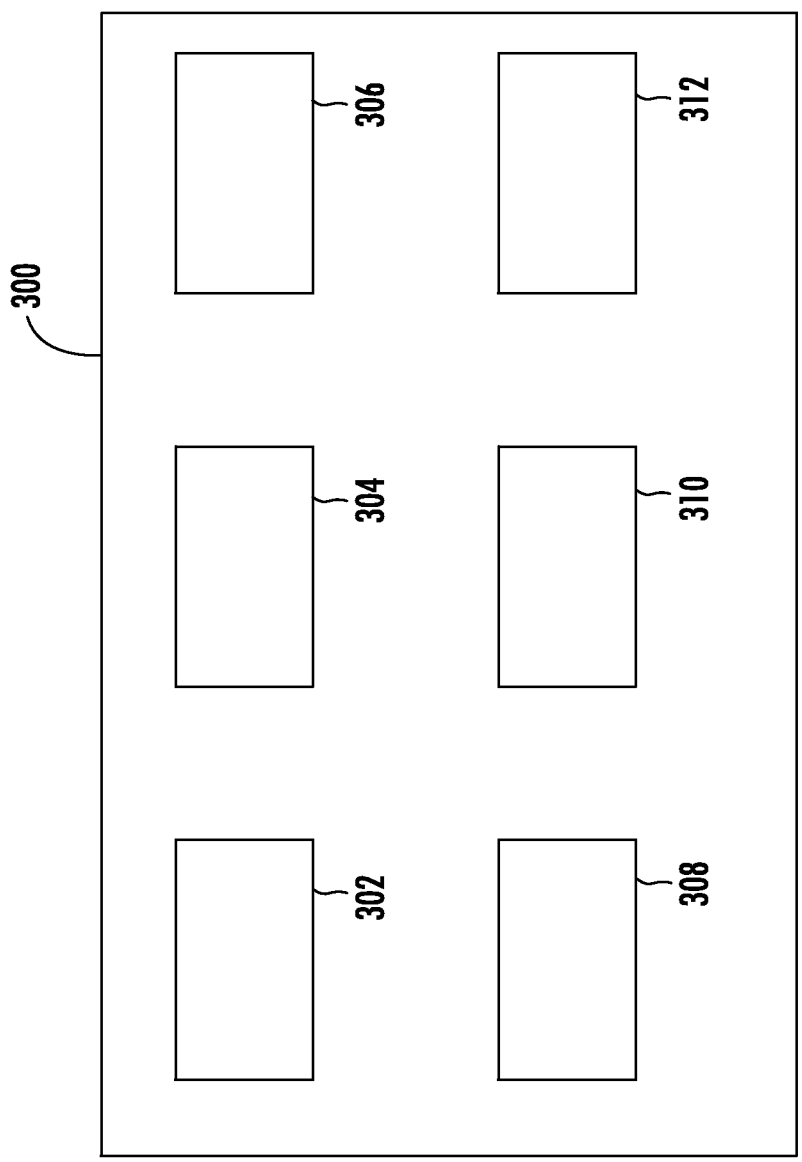
FIG. 8 depicts a representation of an example cryptographic key configuration (CKC) according to example embodiments of the present disclosure.

FIG. 8 depicts a representation of an example cryptographic key configuration (CKC) 300 according to example embodiments of the present disclosure. The CKC can include one or more of the authorized user account data 302, data 304 mapping authorized user accounts to CIKs, cryptographic key data 306, data 308 mapping cryptographic keys to one or more channels, slots, and/or cryptographic units, and/or a load script 310 for loading cryptographic keys and other information to an avionic data transfer system. In some embodiments, the CKC 300 can be a platform CKC (PCKC) that further includes data 312 indicative of cryptographic unit identifiers as well as a mapping of information to cryptographic units of an avionic data transfer system.

The authorized user account data 302 can include data identifying authorized users of the avionic data transfer system, such as individuals authorized to load and process secure aviation data into the avionic data transfer system. The data 304 can include one or more CIKs and data mapping CIKs to authorized users. The data 304 can be used by the avionic data transfer system in requiring the presence of a CIK from a CIK device (e.g., a removable data cartridge with an embedded CIK device) to authenticate an authorized user of the avionic data transfer system.

The one or more cryptographic keys 306 can be used by the host system for cryptographic processing of data (e.g., encrypting and/or decrypting data using various encryption algorithms). For instance, in one example embodiment, the one or more cryptographic keys 306 can be used to cryptographically process secure aviation data. The cryptographic keys 306 and data subject to cryptographic processing can be stored on the same removable storage device, such as a removable data cartridge having a dedicated key memory and a dedicated data memory according to example embodiments of the present disclosure.

The data 308 can be used to map cryptographic keys to various channels, slots, or cryptographic units in the host system. For instance, the data 308 can include header data associated with each of the one or more cryptographic keys. The header data for each cryptographic key can be indicative of the channel, slot, and/or cryptographic unit the cryptographic key is to be used for the cryptographic processing of data.

The load script 310 can be used to load the information from the CKC to the avionic data transfer system. In one embodiment, the load script can implement a key loader for loading keys to a data transfer system from a removable data cartridge according to example aspects of the present disclosure. For instance, the load script can cause one or more cryptographic keys to be loaded to a host device of the avionic data transfer system when the removable data cartridge is interfaced with the host device.

In some embodiments, the CKC can be a PCKC and can include additional data 312 indicative of cryptographic unit identifiers as well as a mapping of information to cryptographic units of an avionic data transfer system. The PCKC can be used to configure an avionic data transfer system having a plurality of cryptographic units. Cryptographic keys can be distributed to the plurality of cryptographic units, using for instance, a host device acting as a key server and in communication with the plurality of cryptographic units over, for instance, a data bus.

Figure 9:
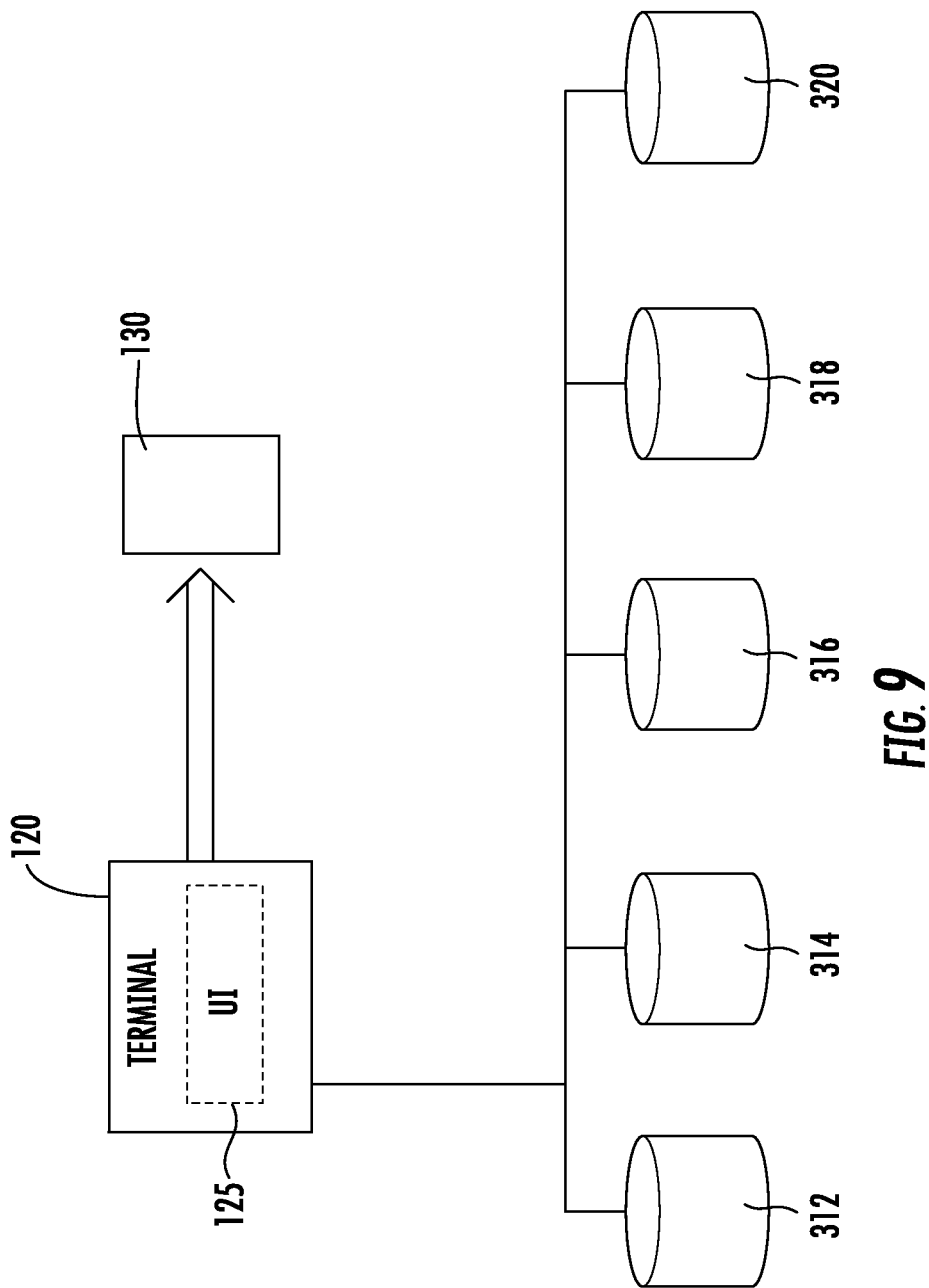
FIG. 9 depicts an example terminal for generating a CKC according to example embodiments of the present disclosure.

According to example embodiments of the present disclosure, the CKC can be generated at a terminal remote from the avionic data transfer system. For instance, FIG. 9 depicts a terminal 120 that can be used to generate a CKC according to example embodiments of the present disclosure. The terminal 120 can be used to generate the CKC and transfer the CKC to a removable data cartridge 130. The removable data cartridge 130 can then be interfaced with the avionic data transfer system to configure the cryptographic elements of the avionic data transfer system.

As shown the terminal 120 can access various databases to generate the CKC according to example embodiments of the present disclosure. For instance, the terminal 120 can access one or more of a user account database 312, a CIK identifier database 314, a cryptographic key database 316, a CKC database 318, and cryptographic unit identifier database 320. The user account database 312 can store data associated with authorized users of one or more cryptographic systems. The CIK identifier database 314 can store data associated with CIKs used for user authentication. Cryptographic key database 316 can store cryptographic keys for cryptographic processing of data by one or more cryptographic systems. CKC database 318 can store CKCs generated by the terminal 120, and cryptographic unit identifier database 320 can store data associated with various cryptographic units in one or more cryptographic systems.

The terminal 120 can access data stored in one or more of the databases 312, 314, 316, 318, and 320 and use the data to generate a CKC. The terminal 120 can include one or more processors and one or more memory devices storing computer-readable instructions that when executed by the one or more processors cause the one or more processors to implement a user interface 125. The user interface 125 allows an administrator to interact with the terminal to perform one or more CKC actions to generate a CKC. The CKC actions can include one or more of the following actions: (1) Retrieve user account data from a repository of user account data. (2) Create/modify/delete user account data in a repository of user account data. (3) Authorize user accounts for cryptographic processing. (4) Retrieve CIK identifier from a repository of CIK identifiers. (5) Create/modify/delete CIK identifiers in a repository of CIK identifiers. (6) Create/modify/delete links between CIK identifiers and User Account Data. (7) Retrieve cryptographic keys from a repository of cryptographic keys. (8) Create/modify/delete links between cryptographic unit channel slots and cryptographic keys. (10) Create/modify/delete CKCs in a repository of CKCs. (11) Create/modify/delete CKC files on a medium for transport to a host system, such as a removable data cartridge.

In embodiments where PCKCs are created, the user interface can allow the administrator to additionally perform one or more of the following CKC actions: (1) Create/modify/delete links between cryptographic equipment identifiers and user account data and CIKs and keys, and platforms. (2) Create/modify/delete scripts to automate the loading of PCKCs into cryptographic equipment on a platform. (3) Create/modify/delete PCKCs in a repository of PCKCs. (4) Create/modify/delete PCKC files on a medium for transport to a platform, such as a removable data cartridge.

Once the CKC has been generated at the terminal, the CKC can be stored on the removable data cartridge 130. The removable data cartridge 130 can then be interfaced with an avionic data transfer system to configure the avionic data transfer system for cryptographic processing of data according to example embodiments of the present disclosure.

Figure 10:
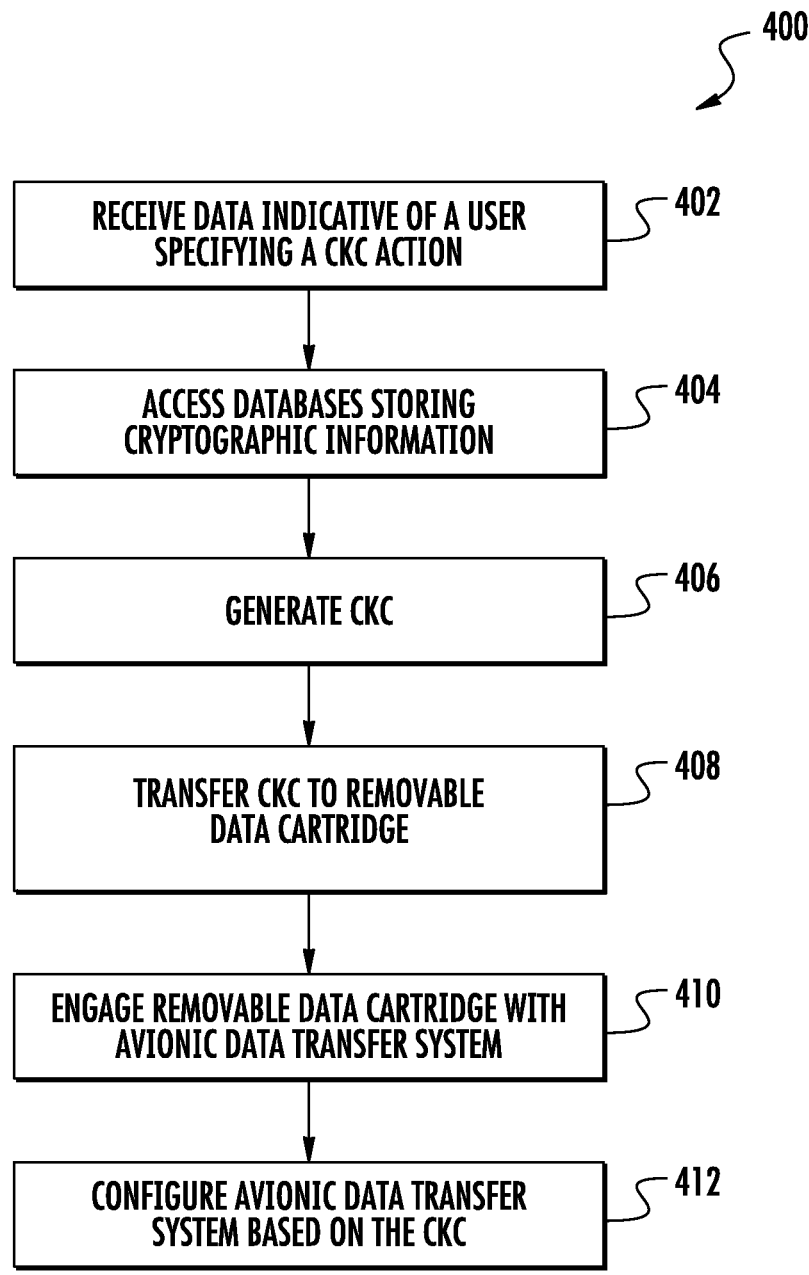
FIG. 10 depicts a flow diagram of an example method according to example embodiments of the present disclosure.

FIG. 10 depicts a flow diagram of an example method (400) of generating a cryptographic key configuration (CKC) according to example embodiments of the present disclosure. The method can be implemented using a cryptographic system, such as any of the cryptographic systems discussed herein. In addition, FIG. 10 depicts steps performed in a particular order for purposes of illustration and discussion. Those of ordinary skill in the art, using the disclosures provided herein, will understand that the steps of any of the methods described herein can be modified, expanded, omitted, adapted, or rearranged without deviating from the scope of the present disclosure.

At (402), the method includes receiving data indicative of a user specifying a CKC action. For instance, data indicative of a user interaction with a user interface (e.g., a graphical user interface) implemented at a terminal can be received. In example embodiments, the CKC action can include one or more of retrieving user account data; creating, modifying, or deleting user account data; authorizing user accounts; retrieving cryptographic ignition keys; creating, modifying, or deleting cryptographic ignition keys; creating, modifying, or deleting links between user accounts and cryptographic key identifiers; retrieving cryptographic keys; or creating, modifying, or deleting links between cryptographic keys and cryptographic unit channels. In example embodiments where the method is used to generate a PCKC, the CKC action can further include creating, modifying, or deleting links between cryptographic equipment identifiers and user account data and cryptographic ignition keys.

In response to receiving the data indicative of the user specifying the CKC action, the method can include accessing one or more databases storing cryptographic information (404). For instance, the method can include accessing one or more of a user account database, a cryptographic ignition key identifier database, a cryptographic key database, or a cryptographic key configuration database. In embodiments where the method is used to generate a PCKC, the method can include accessing a cryptographic unit identifier database.

At (406), the method includes generating the CKC based at least in part on the CKC action and the cryptographic information. In example embodiments, the CKC can include one or more of user account data, data mapping authorized users to cryptographic ignition keys, data indicative of one or more cryptographic keys, data mapping one or more cryptographic keys to one or more cryptographic units, or a load script for loading the one or more cryptographic keys to the cryptographic system. In example implementations, the method can include generating a PCKC additionally having one or more cryptographic unit identifiers.

At (408), the method can include transferring the CKC for storage on a removable data cartridge. In one embodiment, the removable data cartridge includes a dedicated memory configured to store one or more cryptographic keys and a dedicated data memory configured to store data subject to cryptographic processing (e.g., secure aviation data). In one embodiment, the removable data cartridge can include an embedded CIK device.

At (410), the method can include engaging the removable data cartridge with an avionic data transfer system associated with an aircraft. For example, the removable data cartridge can be inserted into a suitable receptacle, slot, or connection at the avionic data transfer system.

At (412), the method can include configuring the avionic data transfer system based at least in part on the cryptographic key configuration. For instance, one or more users can be authorized for cryptographic units, CIKs can be linked with authorized users and/or cryptographic units, cryptographic keys can be associated with cryptographic units, etc. Once configured, the avionic data transfer system can process data (e.g., secure aviation data) according to example embodiments of the present disclosure.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for configuring a plurality of cryptographic systems associated with one or more aircraft using one removable data storage device, comprising:
   receiving, by one or more processors associated with a terminal, data indicative of a user specifying a cryptographic key configuration action;
   accessing, by the one or more processors, one or more databases storing cryptographic information;
   generating, by the one or more processors, a plurality of cryptographic key configurations based at least in part on the cryptographic information and the cryptographic key configuration action, wherein the plurality of cryptographic key configurations comprises a cryptographic ignition key, and wherein the cryptographic key configuration action comprises modifying the cryptographic ignition key; and
   transferring, by the one or more processors, the plurality of cryptographic key configurations from the terminal to a removable data storage device via a connector comprising one or more pins, the connector configured to provide a mechanical and electrical connection; and
   wherein when the removable data storage device is removed from the terminal by disconnecting the connector from the terminal and subsequently interfaced with a first cryptographic system selected from among the plurality of cryptographic systems, the connector of the removable data storage device is configured to provide a mechanical and electrical connection with the first cryptographic system to transmit via the one or more pins a first cryptographic key configuration selected from among the plurality of cryptographic key configurations so as to configure the first cryptographic system.

2. The method of claim 1, wherein configuring the plurality of cryptographic systems is based at least in part on a respective cryptographic key configuration selected from along the plurality of cryptographic key configurations stored on the removable data storage device, the respective cryptographic key configuration corresponding to a respective cryptographic system selected from among the plurality of cryptographic systems, and wherein the plurality of cryptographic systems are avionic data transfer systems.

3. The method of claim 1, wherein the cryptographic key configuration action comprises one or more of retrieving user account data; creating, modifying, or deleting user account data; authorizing user accounts; retrieving cryptographic ignition keys; creating or deleting cryptographic ignition keys; creating, modifying, or deleting links between user accounts and cryptographic key identifiers; retrieving cryptographic keys; or creating, modifying, or deleting links between cryptographic keys and cryptographic unit channels.

4. The method of claim 1, wherein the plurality of cryptographic key configurations comprises a platform cryptographic key configuration.

5. The method of claim 4, wherein the platform cryptographic key configuration comprises cryptographic unit identifiers.

6. The method of claim 5, wherein the one or more databases comprises a cryptographic unit identifier database.

7. The method of claim 4, wherein the cryptographic key configuration action comprises creating, modifying, or deleting links between cryptographic unit identifiers and user account data and cryptographic ignition keys.

8. The method of claim 1, wherein the data indicative of a user specifying a cryptographic key configuration action is based at least in part on a user interaction with a user interface.

9. The method of claim 1, wherein the removable data storage device comprises a dedicated key memory configured to store one or more cryptographic keys and a dedicated data memory configured to store data subject to cryptographic processing.

10. The method of claim 1, wherein the removable data storage device has an embedded cryptographic ignition key device.

11. The method of claim 1, wherein the plurality of cryptographic key configurations comprises one or more of user account data, data mapping authorized users to cryptographic ignition keys, data indicative of one or more cryptographic keys, data mapping one or more cryptographic keys to one or more cryptographic units, or a load script for loading the one or more cryptographic keys to the plurality of cryptographic systems; and
   wherein the one or more databases comprise one or more of a user account database, a cryptographic ignition key identifier database, a cryptographic key database, or a cryptographic key configuration database.

12. The method of claim 1, comprising:
sequentially interfacing the connector with each of the plurality of cryptographic systems and when interfaced with each respective cryptographic system from among the plurality, sequentially transmitting via the one or more pins to the respective cryptographic system from among the plurality, at least one cryptographic key configuration selected from among the plurality of cryptographic key configurations so as to sequentially configure the plurality of cryptographic systems using the removable data storage device.

13. The method of claim 1, comprising:
interfacing the connector with the first cryptographic system and transmitting via the one or more pins the first cryptographic key configuration so as to configure the first cryptographic system using the removable data storage device; and interfacing the connector with a second cryptographic system selected from among the plurality of cryptographic systems and transmitting via the one or more pins a second cryptographic key configuration selected from among the plurality of cryptographic key configurations so as to configure the second cryptographic system using the removable data storage device.

14. A terminal for generating a plurality of cryptographic key configurations and configuring a plurality of cryptographic systems using one removable data storage device, the terminal comprising:
one or more processors; and
one or more memory devices, the one or more memory devices storing computer-readable
instructions that when executed by the one or more processors cause the one or more processors to perform operations, the operations comprising:
receiving data indicative of a user specifying a cryptographic key configuration action;
accessing one or more databases storing cryptographic information;
generating a plurality of cryptographic key configurations based at least in part on the cryptographic information and the cryptographic key configuration action, wherein the plurality of cryptographic key configurations comprises a cryptographic ignition key and wherein the cryptographic key configuration action comprises modifying the cryptographic ignition key; and
transferring the plurality of cryptographic key configurations to the cryptographic system via a connector of a removable data storage device such that the cryptographic system is configured in accordance with the cryptographic key configuration; and
wherein when the removable data storage device is removed from the terminal by disconnecting the connector from the terminal and subsequently interfaced with a first cryptographic system selected from among the plurality of cryptographic systems, the connector of the removable data storage device is configured to provide a mechanical and electrical connection with the first cryptographic system to transmit via one or more pins a first cryptographic key configuration selected from among the plurality of cryptographic key configurations so as to configure the cryptographic system.

15. The terminal of claim 14, wherein the plurality of cryptographic key configurations comprises a platform cryptographic key configuration.

16. The terminal of claim 15, wherein the platform cryptographic key configuration comprises one or more of user account data, data mapping authorized users to cryptographic ignition keys, data indicative of one or more cryptographic keys, data mapping one or more cryptographic keys to one or more cryptographic units, a load script for loading the one or more cryptographic keys to the plurality of cryptographic systems, or data indicative of cryptographic unit identifiers.

17. The terminal of claim 15, wherein the one or more databases comprise one or more of a user account database, a cryptographic ignition key identifier database, a cryptographic key database, a cryptographic key configuration database, or a cryptographic unit identifier database.

18. The terminal of claim 15, wherein the cryptographic key configuration action comprises one or more of retrieving user account data; creating, modifying, or deleting user account data; authorizing user accounts; retrieving cryptographic ignition keys; creating or deleting cryptographic ignition keys; creating, modifying, or deleting links between user accounts and cryptographic key identifiers; retrieving cryptographic keys; creating, modifying, or deleting links between cryptographic keys and cryptographic unit channels; or creating, modifying, or deleting links between cryptographic equipment identifiers and user account data and cryptographic ignition keys.

19. A cryptographic system, comprising:
a terminal configured to generate a plurality of cryptographic key configurations based at least in part on a user interaction with a user interface, wherein the plurality of cryptographic key configurations comprises a cryptographic ignition key and wherein the cryptographic key configuration action comprises modifying the cryptographic ignition key;
one removable data storage device configured to receive the plurality of cryptographic key configurations generated by the terminal via a connector; and
a plurality of avionic data transfer systems, each of the plurality of avionic data transfer systems from among the plurality of avionic data transfer systems comprising one or more cryptographic units and configured to interface with the removable data storage device via the connector and to receive a respective cryptographic key configuration corresponding thereto, the respective cryptographic key configuration selected from along the plurality of cryptographic key configurations stored on the removable data storage device, and to load the respective the cryptographic key configuration to the one or more cryptographic units;
wherein when the removable data storage device is removed from the terminal by disconnecting the connector from the terminal and subsequently interfaced with one of the avionic data transfer systems, the connector of the removable data storage device is configured to provide a mechanical and electrical connection with the avionic data transfer system to transmit via one or more pins the respective cryptographic key configuration so as to configure the avionic data transfer system.

20. The cryptographic system of claim 19, wherein the plurality of cryptographic key configurations comprises one or more of user account data, data mapping authorized users to cryptographic ignition keys, data indicative of one or more cryptographic keys, data mapping one or more cryptographic keys to one or more cryptographic units, or a load script for loading the one or more cryptographic keys to the plurality of avionic data transfer systems.

21. The cryptographic system of claim 19, wherein the terminal comprises one or more databases, the one or more databases comprising one or more of a user account database, a cryptographic ignition key identifier database, a cryptographic key database, or a cryptographic key configuration database.

22. The cryptographic system of claim 19, wherein the removable data storage device comprises a dedicated key memory configured to store one or more cryptographic keys and a dedicated data memory configured to store data subject to cryptographic processing; and
wherein the removable data storage device comprises a cryptographic ignition key device.

* * * * *